May 20, 1941.   F. S. FLOETER   2,242,579
CHUCK
Filed July 1, 1940   2 Sheets-Sheet 2

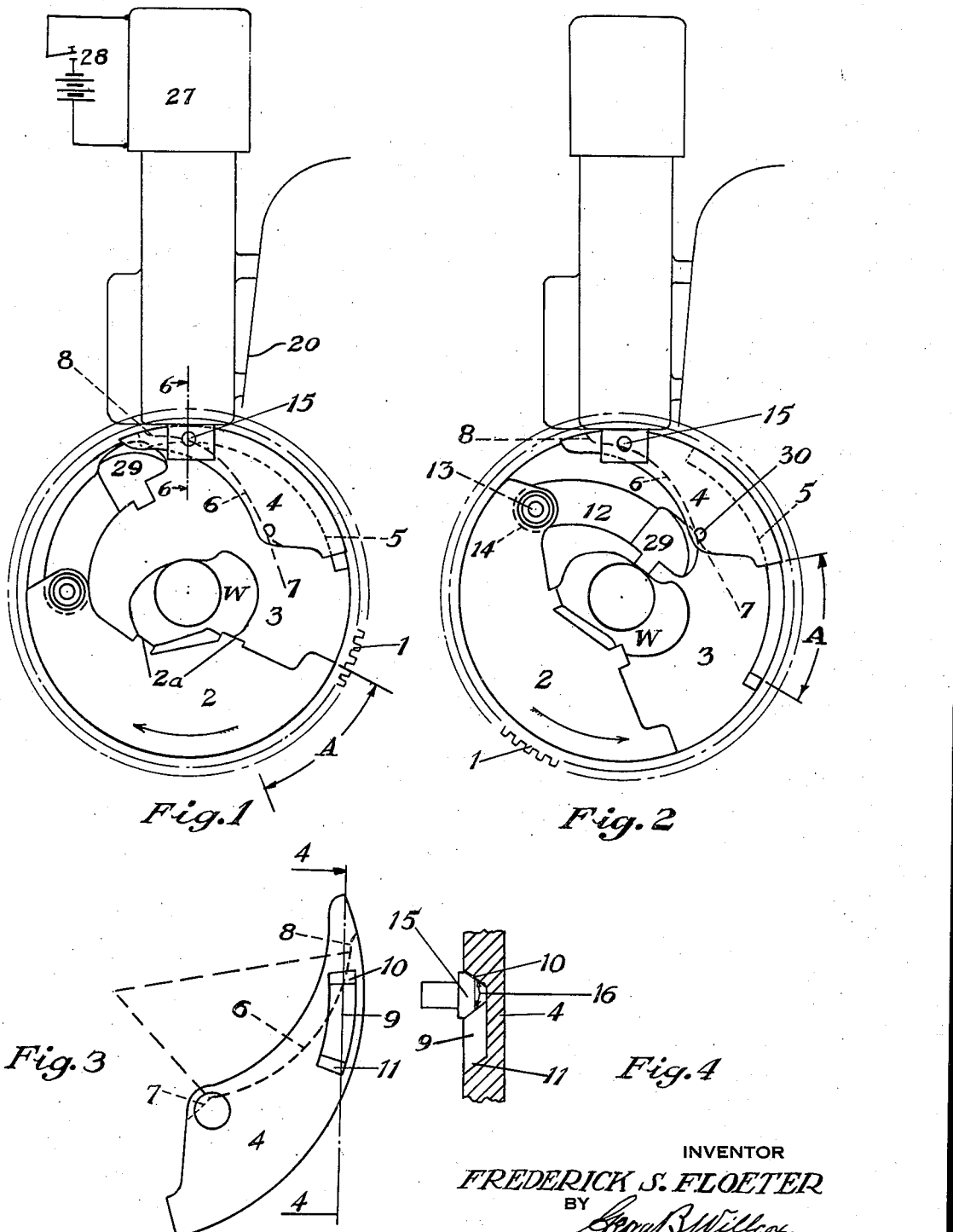

INVENTOR
FREDERICK S. FLOETER
BY
ATTORNEY

Patented May 20, 1941

2,242,579

UNITED STATES PATENT OFFICE 2,242,579

CHUCK

Frederick S. Floeter, Saginaw, Mich., assignor to Wickes Bros., Saginaw, Mich., a corporation of Michigan Application July 1, 1940, Serial No. 343,367

9 Claims. (Cl. 82—40)

This invention relates to improvements in ring gear chucks known as "center drive" chucks, used in lathes to support and rotate work pieces such as engine crank-shafts whose line bearings, crank pins, flanges, or web cheeks are being turned or faced.

More particularly, my invention is intended for use with lathe chucks wherein a work-clamping jaw is hinged to the web of a ring gear and a slidable cam is used to clamp and release the jaw.

Objects of the invention in general are: to provide a novel chuck structure whose work-clamping members shall be actuated and controlled for loading and unloading in such manner as to materially increase the rate of output of work; to provide a chuck that shall clamp, hold and release the work more conveniently and efficiently, yet avoid creating undesirable torsional stresses in the work during the chucking operation; to provide a chuck that utilizes the driving power of the lathe not only to clamp the work but also to release it, thereby freeing the operator from the laborious and hazardous task of reaching into the lathe and lifting and handling heavy chuck members in order to locate, adjust, clamp, and lock or unlock them each time a work piece is put in or removed.

More specifically, my invention provides means for keeping the slidable cam of the chuck temporarily motionless while the lathe mechanism is driving the ring gear through a part revolution to cause the chuck to seize the work or, reversely, to release it. Except when work is being clamped or released the cam revolves with the chuck ring.

Another object is to provide release means whereby the cam shall automatically disengage itself from the keeper device whenever the gripping force applied to the work by the cam shall exceed an amount for which the keeper was adjusted.

With the foregoing and certain other objects in view which will appear later in the specification, my invention comprises the devices described and claimed and the equivalents thereof.

Fig. 1 is a face view of a ring gear chuck, the hinged clamping jaw being raised for loading and unloading the work piece. Shown associated with the chuck is a solenoid-actuated keeper for holding the slidable cam.

Fig. 2 is a similar view showing the hinged jaw lowered and clamping the work piece in the chuck.

Fig. 3 is an enlarged side view of the slidable cam.

Fig. 4 is an enlarged sectional detail of the same, on line 4—4, Fig. 3, and showing a keeper pin received in a recess of the cam.

Figure 5:
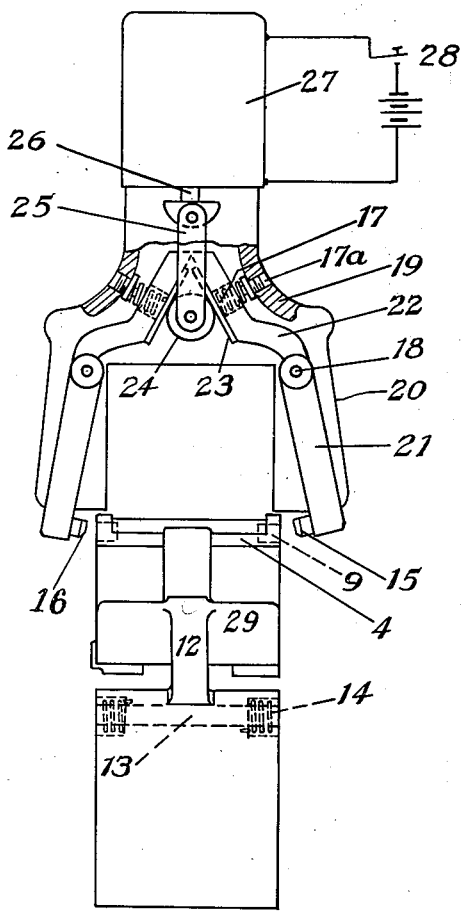
Fig. 5 is an edge view of the chuck without its ring gear and housing and showing the keeper in inoperative position relatively to the cam, portions of the frame or enclosure for the keeper being shown in section.
Figure 6:
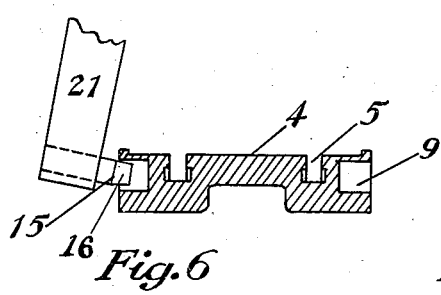
Fig. 6 is an enlarged sectional view of the cam on line 6—6 of Fig. 1 with the keeper pin partly inserted in the recess.

I have illustrated a chuck comprising a ring gear 1 whose body or web portion 2 presents supports 2a for a work piece W to be machined, and has a large work-receiving aperture 3.

In embodying my invention in such a chuck I provide a cam 4, somewhat sector-shaped, which is mounted on the body 2 and is shiftable relatively thereto in the direction of its length along an arcuate path on ways 5 that extend part way around the inner periphery of the ring gear 1.

Preferably the working face 6 of the cam is concave inwardly. An end portion 7 of face 6 is radially nearer the axis of rotation of the chuck than its other end 8. An elongated arcuate recess 9 (Fig. 3) is provided in the outer side wall of cam 4. Recess 9 has its end walls 10, 11 beveled outwardly at an angle of about thirty degrees, substantially as shown in Fig. 4.

Means is provided for arresting and releasably keeping cam 4 motionless in an indexed position while the ring gear 1 and the body 2 with its associated parts are given a partial rotation, i. e. clockwise as indicated by the arrow, Fig. 1, when the work W is to be clamped and locked to the ring gear prior to machining; or counter-clockwise, as shown by the arrow, Fig. 2, when the work is to be unclamped after having been machined.

A jaw 12 is hinged to the chuck body 2 by a trunnion 13 so as to swing across the aperture 3 and is normally urged against the cam face 6 by means of torsion springs 14 on the trunnion 13.

In Fig. 1 the jaw is shown in open position with the work W unclamped, and in Fig. 2 the jaw is closed and the work is clamped. With the cam 4 kept immovable, the jaw will clear the work at the end of a partial rotation of the chuck in one direction and at the end of a partial rotation of the chuck in the opposite direction the jaw clamps the work by being forced wedgewise between the work W and the nearer end 7 of cam face 6.

The cam keeper alluded to above comprises a pair of oppositely directed gudgeons or pins 15. Preferably each gudgeon presents beveled side faces 16, 16, Fig. 4, that match the outwardly beveled end walls 10, 11 of the recess 9 in cam 4, as shown in Fig. 4. Normally the gudgeons 15 are urged away from the recesses 9 of cam 4 by means of compression springs 17, Fig. 5. The spring pressure is adjustable by means of a threaded bolt and nut 17a on a fixed support, 19.

Each gudgeon can be inserted in its recess by means of a power-actuated mechanism controllable by the operator, as will now be described.

Referring to Fig. 5, numeral 18 designates a pivot fixed to a frame 19 that may be secured to housing 20, Fig. 1, of ring gear 1. A lever mounted to oscillate on the pivot 18 has a downward arm 21 that carries the gudgeon 15, and an upward arm 22 of the lever presents an inclined guide face 23. Between the guide faces 23 of two such opposed arms 22, 22 a member such as a roller 24 is received. The roller is connected by links 25 with the longitudinally movable armature 26 of solenoid 27, or any other appropriate device for moving the roller 24 up and down.

Assuming the chuck to have been set in an approximately indexed position, Fig. 1, and that a work piece W is in the aperture 3 of the ring gear 1, resting upon supports 2a on web 2; and also that lathe centers, not shown, have been engaged with the ends of the work and further assuming that the ring gear 1 of the chuck is operative from a power driven lathe, the work clamping and releasing operations are as follows.

The operator energizes solenoid 27, as by pushing a control button 28. Armature 26 moves upward and roller 24 forces the arms 22 of the lever apart, thus causing the gudgeons 15 on arms 21 to enter the recesses 9, 9, in the side walls of cam 4, holding the cam motionless for the time being.

The operator then starts the lathe, rotating the chuck body 2 and jaw 12 clockwise, as indicated by the curved arrow, Fig. 1. The beveled end wall 10 of recess 9, Figs. 3 and 4, thereupon engages the beveled face 16 of gudgeon 15. While the cam 4 is thus kept motionless, further clockwise rotation of body 2 causes a head portion 29 of the clamping jaw 12 to move along the concave inner working face 6 of the cam, from a position 8 toward 7. When the head 29 arrives at position 7 on the cam, as illustrated in Fig. 2, the head becomes tightly engaged, wedgewise, between an anti-wear block 30 on cam 4 and the work piece W, firmly locking the work and the chuck body 2 together.

It will be observed that while the chuck was being rotated relatively to the temporarily immovable cam 4 the ring gear rode around in the arcuate ways 5 at the outer periphery of the cam.

The body 2, head 29, and cam 4 are proportioned and arranged so that ring gear 1, while making approximately one-eighth of a revolution as indicated at A, shall cause the cam to clamp the head 29 of jaw 12 wedgewise against the work W, in Fig. 2 position, tightly enough to overcome all stresses that can be created by the work during heavy duty machining operations.

The work is now clamped. Next the control button 28 is released and the solenoid allows the gudgeons 15 to withdraw from engagement with cam 4 by the normal action of springs 17 and lever arms 22.

The operator then starts the lathe and rotates the chuck in the direction designated by the counter-clockwise arrow, Fig. 2. Cam 4, now freed from the keeper gudgeons 15, goes as an integral part of the chuck while the work is being machined. When machining has been finished the lathe is stopped with the cam in its indexed position, Figs. 1 and 2.

The head 29 of jaw 12 is then released from its wedged position as follows: The operator once more actuates the solenoid button 28 and engages the gudgeons 15 in the cam recesses 9, again keeping cam 4 immovable. He then starts the lathe in reverse and rotates the chuck body 2 and the jaw 12 counter-clockwise, as indicated by the curved arrow, Fig. 2. The ring 1 slides on the arcuate ways 5 reversely around the outer face of the cam, the head 29 traveling along the inner working face 6 toward the left from 7 to 8, Figs. 2 and 1, and so unclamps the work W. During such retrograde movement of the head 29 the torsion springs 14 on trunnions 13 of jaw 12 urge the jaw 12 outwardly, thus restoring the head 29 to its original open position, Fig. 1. The work W can now be removed from the chuck and a new work piece can be inserted.

From the foregoing description it will be apparent that the gudgeons 15 are used to keep the cam 4 motionless only while the jaw head 29 is being moved along the cam face 6, at first to clamp the work, and afterwards to unclamp it. As a safety feature the beveled end walls 10, 11 of the cam recesses 9 shown in Fig. 4 and the correspondingly beveled side faces 16 of the gudgeons 15, togethehr with the pressure adjustable springs 17 on the upward arms 23 provide means for releasing the cam 4 and so permitting it to move around like an integral part part of the ring gear 1, if the lathe's turning effort on the ring gear should exceed an amount for which springs 17 are set. Under such circumstances the bevel-sided gudgeons will pop out of the recesses 9 automatically, thus releasing the cam in the event that the operator neglects to release solenoid button 28 when adequate clamping effort has been attained.

The objects, mode of operation, and preferred structural features of my invention may now be summarized.

A high rate of lathe output is attained, as will be appreciated after noting the operator's simple and almost effortless routine.

To clamp the work and machine it he closes switch 28, thereby holding the cam 4 immovable; he then runs the lathe in reverse to rotate the chuck-ring through part of a revolution, A, Fig. 2, and so clamps the work W. The work being clamped, he then opens switch 28 and operates the lathe in the machining direction, Fig. 1, until the work is finished, then stops the lathe. The work piece has not been subjected to any undesirable torsional stresses, because it is kept without strain during the clamping operations of the chuck.

After the work has been machined the operator releases it from the clamping action of the chuck by closing switch 28, and running the lathe in reverse to give the chuck a partial turn, A. The chuck aperture is then wide open and the work is ready to be taken out.

It is seen that the driving power of the lathe is utilized not only to clamp the work, as had been done in earlier devices, but also to unclamp the chuck after the work has been machined and to clear the chuck aperture to allow the work to be taken away.

For releasing the jaw from its work-engaging position no wrench or other auxiliary appliance is required, as has been proposed heretofore. The maximum clamping pressure permitted to be exerted upon the work W by the power of the lathe is readily controlled by merely adjusting the spring pressure at 17. The tightening of the grip of the jaw on the work is accomplished without any resistance to rotation being offered by the work during the clamping operation, so a crank-shaft or similar work piece can not become strained or twisted by any action of the clamping mechanism of the chuck. The work is not twisted out of index while it is being clamped. During the act of clamping it rotates freely with the chuck. It need not be held against rotation as was the case in earlier devices.

Having thus described my invention, what I claim and desire to secure by Letters Patent is:

1. In a chuck having a ring gear and an apertured body presenting supports for a work piece, a cam mounted within the ring gear for arcuate sliding movements in either direction, said cam being provided internally with an eccentrically disposed face and with a recess having beveled end walls; a clamping jaw hinged for movement of its free end toward and away from a work piece on said supports; means urging the jaw constantly against said eccentric cam face; a keeper having beveled side faces for holding the cam motionless during partial revolution of the ring gear in either direction; means for moving the keeper into locking engagement in the recess and for disengaging the same; a spring normally urging the keeper away from the cam; and pressure adjusting means for said spring.

2. In a lathe chuck having a ring gear and an apertured body presenting supports for a work piece, a cam mounted within the ring gear for arcuate sliding movements in either direction, said cam being provided internally with an eccentrically disposed face; one end of said face being nearer the chuck axis than the other end; a clamping jaw hinged for movement of its free end toward and away from a work piece on said supports; means urging the jaw constantly against said eccentric cam face; a keeper for holding the cam motionless during a partial revolution of the ring gear in either direction and means for freeing the cam from such holding during complete rotations of the ring gear and chuck body; and means for moving the keeper into locking engagement with the cam and for disengagement from the same.

3. In a chuck having a ring gear and an apertured body presenting supports for a work piece; a cam mounted within the ring gear for arcuate sliding movements in either direction, said cam being provided internally with an eccentrically disposed face; a clamping jaw hinged for movement of its free end toward and away from a work piece on said supports; means urging the jaw constantly against said eccentric cam face; a keeper for holding the cam motionless during partial revolution of the ring gear in either direction; and means for moving the keeper into locking engagement with the cam and for disengagement from the same, comprising a lever pivoted on a stationary support, the keeper being secured to an arm of the lever and located adjacent the path of travel of said cam; the other arm of the lever having an inclined face; a member shiftable along said face for actuating the lever; and actuating means for shifting said member.

4. In a lathe chuck having a ring gear and an apertured body presenting supports for a work piece, a cam mounted within the ring gear for arcuate sliding movements thereon in either direction, said cam being provided internally with an eccentrically disposed face; a clamping jaw hinged for movement of its free end toward and away from a work piece on said supports; means urging the jaw constantly against said eccentric cam face; the construction being such that the hinged clamping jaw will grip the work when the ring gear and clamping jaw are rotated in one direction relatively to the cam, and will release the work and move clear thereof when the gear is rotated in the reverse direction; and a keeper for holding the cam motionless during a partial revolution of the ring gear in either direction.

5. In a chuck having a ring gear and an apertured body presenting supports for a work piece, a cam mounted within the ring gear for arcuate sliding movements in either direction, said cam being provided internally with an eccentrically disposed face; a clamping jaw hinged for movement of its free end toward and away from a work piece on said supports; means urging the jaw constantly against said eccentric cam face; a keeper for holding the cam motionless during partial revolution of the ring gear in either direction; and means for moving the keeper into locking engagement with the cam and for disengagement from the same.

6. A rotatable chuck body for receiving and supporting a work piece to be machined having, in combination, a cam mounted on said body and shiftable lengthwise relatively thereto along an arcuate path, an end portion of the inner working face of said cam being radially nearer the axis of the chuck than its other end; releasable means for arresting and keeping the cam motionless during partial rotation of the chuck body in either direction; a work-engaging jaw hinged to the chuck and means for normally keeping the jaw in co-operative engagement with said cam face, a portion of said jaw being arranged for engagement wedgewise between the work and an end portion of the cam face at the completion of a partial rotation of the chuck in one direction.

7. In a chuck having a ring gear and an apertured body presenting support for a work piece, a cam mounted within the ring gear for arcuate movement relative thereto, said cam being provided with an eccentrically disposed face, a clamping element hinged to the chuck and engaging said cam face so as to be moved into clamping engagement with said work piece by a partial rotation of the ring gear; and releasable means for holding the cam motionless during rotation of the ring gear and work piece in clamping direction.

8. In a chuck having a ring gear and an apertured body presenting support for a work piece; a cam mounted within the ring gear for arcuate movement relative to the chuck body and having an eccentrically disposed face; a clamping element mounted for movement along said cam face and into engagement with said work piece, and releasable means for holding the cam motionless during rotation of the ring gear and work piece in clamping direction.

9. In a chuck including a ring gear having an apertured body presenting support for a work piece; a cam having an eccentrically disposed face mounted within the ring gear, said cam and body being movable relatively to each other; a clamping element mounted for movement along said face into engagement with the work piece during a partial rotation of the ring gear, body and work piece; and means for releasably holding the cam against rotation during rotation of the ring gear.

FREDERICK S. FLOETER.